United States Patent [19]

Hsu

[11] Patent Number: 4,632,248

[45] Date of Patent: Dec. 30, 1986

[54] SOUND/VIDEO-RECORDING TAPE STORING DEVICE

[76] Inventor: Feng-mei Hsu, 3rd Floor, No. 15, Lane 142, Chunghsin Road, Sec. 4, Sanchung City, Taipei Hsien, Taiwan

[21] Appl. No.: 760,071

[22] Filed: Jul. 29, 1985

[51] Int. Cl.<sup>4</sup> ............................................ B65D 85/672
[52] U.S. Cl. .................................... 206/387; 220/347; 312/319; 312/333
[58] Field of Search ............................ 206/45.13, 387; 220/346, 347; 312/8–19, 319, 333

[56] References Cited

U.S. PATENT DOCUMENTS

3,854,784 12/1974 Hunt et al. ............................. 312/10
3,899,229 8/1975 Ackeret ................................ 312/319
4,268,076 5/1981 Itoi ...................................... 312/333
4,493,417 1/1985 Ackeret ............................. 206/45.13

Primary Examiner—William Price
Assistant Examiner—Jimmy G. Foster

[57] ABSTRACT

This invention is related to an article storing device, particularly to a container for storing the cassettes of sound/video-recording tape or even computer disc, which mainly consists of a case, a drawer, a spring, a or a set of brake block, and a lifting spring leaf, and is characterized by making use of the interaction of some guide grooves in the case, a or a set of brake block pivotally mounted on the back side of drawer, and a spring so as to be closed through an easy push inward by a single finger, and to be quickly opened through a light push on any position of front plate of the drawer thereby, or even to make the article contained therein automatically float up in extreme favor of storing and taking out the said article without inclining the drawer.

5 Claims, 11 Drawing Figures

SOUND/VIDEO-RECORDING TAPE STORING DEVICE

BACKGROUND OF THE INVENTION

This invention is related to a sound/video-recording tape storing device, particularly to an improvement of U.S. Pat. No. 3,899,229 "Container for Tape Cassettes" (as shown in the Annex). The said container for tape cassettes is an improved drawer-type container based on the conventional and simple one which consists of a base case and a transparent enclosure. In comparison with the conventional one, the said container for tape cassettes can be closed through a easy push inward by a single finger and to be quickly opened through a push on the push button thereby so as to conveniently put the tape cassette in the said container and take same out therefrom. The design of said container is deliberate but there are a plurality of impractical defects as follows:

1. A push button 25,25' is mounted on only one side of the drawer 2,2'; it has to push the said push button upward with a finger so that the drawer can be opened, but this opening action is rather less smooth, or even the users in general cannot open and use it, sometimes it has to push the push button for more than two times to open it, so the opening action is less convenient.

2. When to close the said drawer 25.25' in an open state, it is mainly to use a finger to press the wall face on the front end of said drawer so as to push the said drawer into the case 1,1', and the said drawer is positioned by an incision 24,24' preset on one side of said case through a catching action by the tooth 23,23' on the lower or outer side of push button 25,25'; however, when the push button is molded with plastic, a thinner leaf spring 22,22' is extended from the base plate of drawer 2,2', the said tooth 23,23' can be caught into the said incision 24,24' through the elastic force of such a leaf spring 22,22'; since the said leaf spring 22,22' made of plastic is very thin and will lead to an elastic fatigue as the said container is always placed in front of the car driver's seat to be exposed to the sun or for other foreign factors, the said tooth 23,23' cannot be caught into the incision 24,24' strictly when closing the said drawer which is therefore cannot be opened or kept in a closed state very often.

3. In addition, a push button 25,25' has to be installed on the drawer 2,2' for keeping the said drawer in a closed state, so a suitable clearance (as shown in FIG. 2 and 5 of said U.S. Patent) has to be left between the push buttom 25,25' and the opening edge of case 1,1' or even between the front wall 7 of drawer and the said opening edge, and the said container without airtight and dustproof action cannot protect the tape contained therein.

4. Furthermore, since no lifting accessory or device is installed in such a container, the article contained therein cannot automatically float up after the drawer is opened. If the width of said article is about the same as that of the drawer, it is extremely enconvenient or uneasy to take the said article out therefrom.

In view of the foregoing drawbacks of current more practical "container for tape cassettes" and the video recording tape, sound recording tape and computer disc in urgent need of a container with conveniently opening, closing, placing and taking operations as well as factual dustproof action, this inventor has improved it and invented a much better "sound/video recording tape storing device" which is characterized by being closed through an easy push inward by a single finger and quickly opened thru a light push on any position of the front plate of drawer thereby in extreme favor of placing and taking the above-said article which can automatically float up without inclining the said drawer; meantime, capable of overlapping, connecting and mounting a plurality of the cases together or traversely or longitudinally installing several or a plurality of drawers in the same one large case with several or a plurality of separate cases for desirable portability in extreme favor of individually opening and closing each one of said container; and particularly capable of the action of airtightness and dustproofness since the perimeter of front plate of the drawer closely matches with the opening edge of the case body of the case.

SUMMARY OF THE INVENTION

This invention is related to an article storing device, particularly to a container for storing the cassettes of sound/video-recording tape or even computer disc, which mainly consists of a case, a drawer, a spring, a or a set of brake block, and a lifting spring leaf, and is characterized by making use of the interaction of some guide grooves in the case, a or a set of brake block pivotally mounted on the back side of drawer, and a spring so as to be closed through an easy push inward by a single finger, and to be quickly opened through a light push on any position of front plate of the drawer thereby, or even to make the article contained therein automatically float up in extreme favor of storing and taking out the said article without inclining the drawer; meantime, capable of overlapping, connecting and mounting a plurality of the cases together or traversely or longitudinally installing several or a plurality of drawers in the same one large case with several or a plurality of separate cases for desirable portability in extreme favor of individually opening and closing each one of said containers; and particularly capable of the action of airtightness and dustproofness since the perimeter of front plate of the drawer closely matches with the opening edge of the case body of the case.

DETAILED DESCRIPTION OF THE PREFERRED EMBODIMENTS

Figure 1:
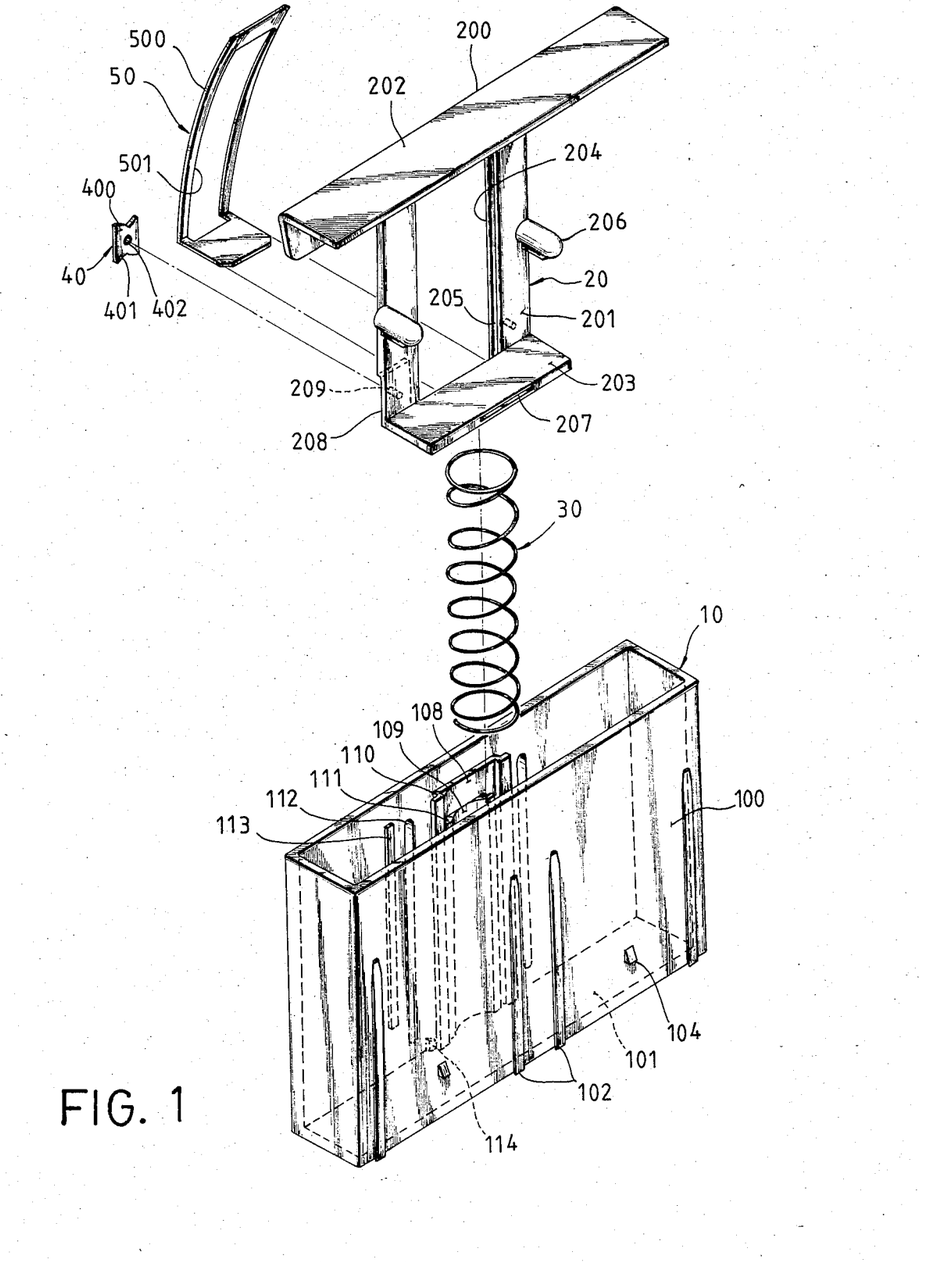
FIG. 1 is an elevation view of various components of this invention.
Figure 2:
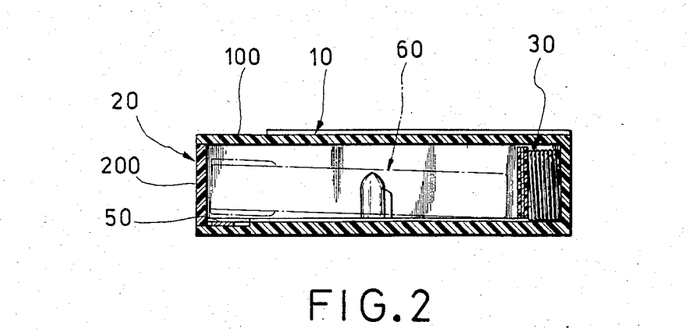
FIG. 2 is a longitudinal sectional view of this invention in a closed state wherein the imaginary line indicates a sound recording tape cassette contained in the drawer.
Figure 3:
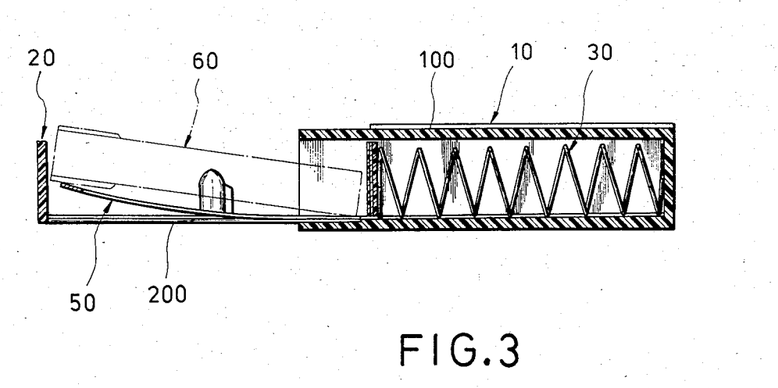
FIG. 3 is a longitudinal sectional view of this invention in an open state wherein the imaginary line indicates a sound recording tape cassette contained in the drawer.

As shown in FIGS. 1, 2 and 3, the "sound/video-recording tape storing device" of this invention is mainly composed of a case 10, a drawer 20, a spring 30, a or a set of brake block 40 and a lifting spring leaf 50.

Figure 5:
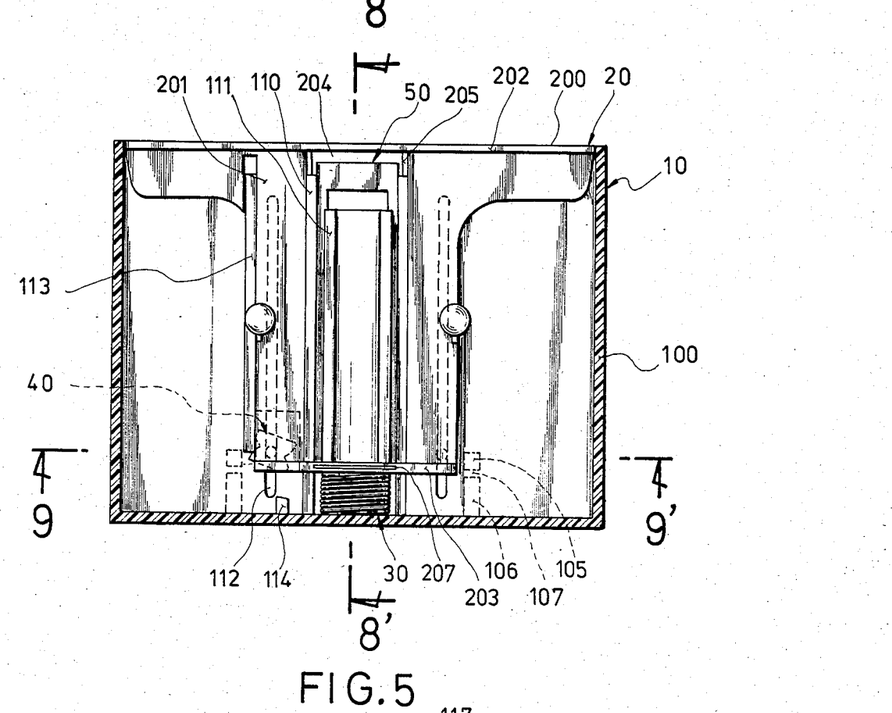
FIG. 5 is a plan view of this invention in a closed state.
Figure 8:
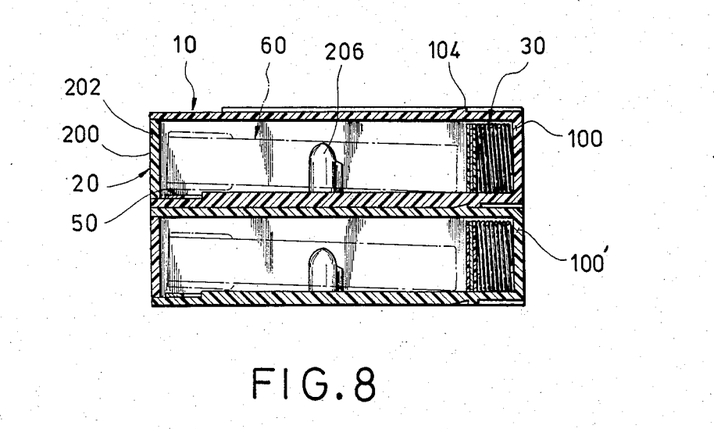
FIGS. 8 and 9 are longitudinal sectional views of this invention during overlapping and connecting actions in 8-8' and 9-9' positions of FIG. 5.
Figure 9:
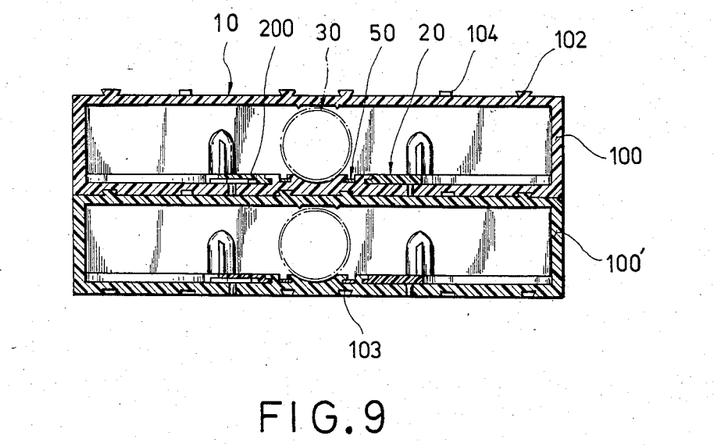

The case 10 is a hollow case body 100 with base 101, a plurality of conventional dovetail convex ribs 102 are on the upper surface of case body 100, and a plurality of conventional dovetail fillisters 103 are on the lower surface thereof in a corresponding positions (as shown in FIG. 9). Through inserting the said several convex ribs 102 on one case body 100' in the said several corresponding fillisters 103 on another case body 100, every two cases 10 can be overlapped and connected (as shown in FIGS. 8 and 9). In order to position the said two cases 10 during overlap and connection, it is designed to have a pair of bevel triangular projections 104 with suitable height on the upper surface of case body 100 nearby rear side, a pair of recesses 105 with corresponding dimension, area and depth on the lower surface thereof in the corresponding positions, two grooves 106 on the rear side thereof, and a rib-shaped flange 107 between each recess 105 and groove 106 (as shown in FIGS. 5 and 8) so that when the case body 100 of each container is inserted onto another case body 100', the two grooves 106 can guide the two projections 104 to cross the two rib-shaped flanges 107, so as to catch these projections 104 in the two recesses 105 with a positioning sense and action but without coming off in the reverse direction. A plane convex wall 108 in the center on the inner side of the lower wall of case body 100 and the opposite U-shaped guide grooves 110 on the two sides of said convex wall 108 are designed to insert a drawer 20 which can be placed in the case body 100 in favor of the opening and closing actions. Another U-shaped guide grooves 111 on the two sides of arcked convex wall 109 in the center of said plane convex wall 108 are designed to install a lifting spring leaf 50. As shown in FIG. 9, the center of circle of said arcked convex wall 109 is at the center of a spring 30 contained in the case body 100 for mounting the spring 30 so that when compressed by the drawer 20 at each time (as the state shown in FIG. 2), the spring 30 will not be distorted or deformed. Two guide grooves 112 on the inner wall on the lower side of case body 100 on the two outer sides of said plane convex wall 108 are designed to pivotally insert the two convex pillars 209 on the back side of drawer base plate 201, to guide the drawer 20 to open or close, and to let the drawer 20 stop at the outer ends of the said two guide grooves 112 when the spring 30 springs the drawer 20 out of the case body 100 (as shown in FIG. 4) without coming off. A lug 114 in a position nearby the case body bottom 101 on the outer side on one or two U-shaped guide grooves 110, and a rib 113 on the outer side of one or two guide grooves 112, are designed to control and guide the brake block 40 pivotally mounted on the drawer body 200, to keep the drawer body 200 in place when closed and to make the opening action of drawer body 200 smooth.

Figure 4:
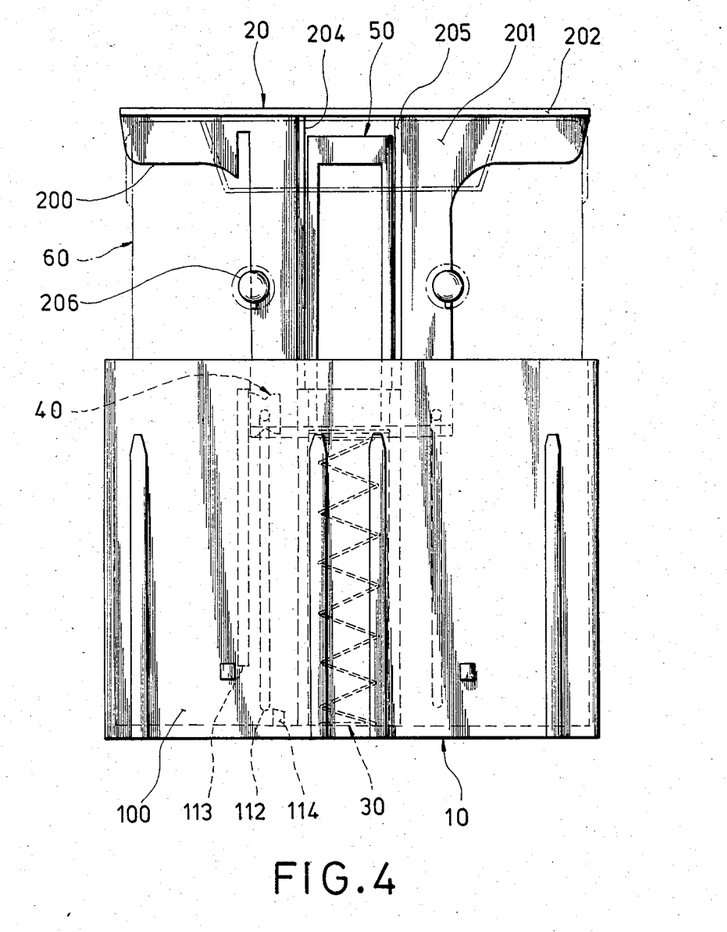
FIG. 4 is a plan view of this invention in an open state.

As shown in FIGS. 1, 4 and 5, the drawer 20 is composed of a U-shaped shallow drawer body 200 comprising a base plate 201 whereon a window is at the center, a front plate 202 (of which the dimension meets with the opening edge of case body 100) and a rear plate 203 whereon a longitudinal penetrating slot 207 is at the center corresponding to the sectional shape and size of lifting spring leaf 50 for inserting the said lifting spring leaf 50. Two convex pillars 206 may be installed on the base plate 201 in favor of containing a sound recording tape cassette 60 in the drawer body 200 (as shown by the imaginary lines in FIGS. 2, 3, 4 and 8). In order to smoothly insert the drawer 20 in the case body 100 of case 10 to be freely opened and closed, two corresponding stepped flanges 205 on the inner edges on two sides of the central window 204 on the base plate 201 certainly may be in keeping with the opposite U-shaped guide grooves 110 on two sides of plane convex wall 108 on the inner side of lower wall of case body 100. In the rear of back side of base plate 201, one or two lower stepped planes 208 in the positions corresponding to those of one or two guide grooves 112 on the inner wall on the lower side of case body 100, and a convex pillar 209 on the said lower stepped plane 208, are designed to pivotally mount a or a set of brake block 40 so as to control the opening and closing actions of drawer body 200 and keep the closing state thereof in the case body 100.

As shown in FIGS. 1 to 5, the spring 30 is made from piano wire with a suitable diameter into a suitable number of coils with a diameter of spring to be exactly mounted in the arcked convex wall 109 on the lower inner wall of case body 100 so as to enable the drawer 20 to automatically open itself.

Figure 6:
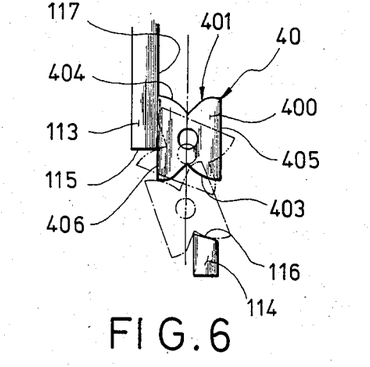
FIGS. 6 and 7 are detailed optional plan views of brake block actions when the drawer of this invention is closed and opened respectively.
Figure 7:
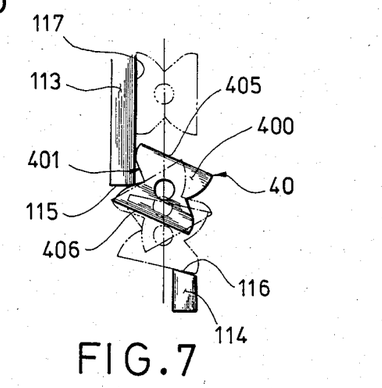

As shown in FIG. 1, the brake block 40 is a square or rectangular block body 400 whereon two opposite cam surfaces or V-notches 401 are on two sides and a pivot point or hole 402 is at the center, and is pivotally mounted on the convex pillars 209 on the back side of base plate 201 of drawer body 200 so as to control the opening and closing actions of drawer body 200 and keep the closing state thereof in the case body 100. As shown in FIGS. 4 to 7, when the drawer 20 is pushed into the case body 100 with a finger as shown in FIG. 5, the brake block 40 moves inward along the rib 113 on the inner wall on the lower side of case body 100 (as shown in FIG. 6). When the arcked inclined plane 403 of upper V-notch 401 on the brake block body 400 contacts the lug 114 on the inner wall on the lower side of case body 100, the brake block 40 moves obliquely along the inclined plane 116 of lug 114. When the finger pressure on the front plate 202 of drawer body 200 is released, the drawer body 200 may spring outward to open through the elastic force of spring 30; however, the arcked inclined plane 404 of lower V-notch 401 on the brake block 40 contacts the end plane 115 of rib 113 on the inner wall on the lower side of case body 100 to catch the inner edge 117 of rib 113 in a state of traverse placement so that the drawer body 200 cannot continue to spring out but is kept in the case body 100 to be closed and remain in a closing state. To open the drawer body 200, only to press the drawer 20 inward with a finger to let the drawer body 200 move slightly inward toward the case body 100 so that the brake block 40 follows to move inward, and the edge 406 on the upper side of brake block body 400 in a state of traverse placement contacts the inclined plane 116 of lug 114 on the inner wall on the lower side of case body 100 and rotates slightly toward left for a certain angle (as shown in FIG. 7). When the finger pressure on the front plate 202 of drawer body 20 is released, the drawer body 200 is sprung outward to prepare for the opening action thru the elastic force of spring 30. Meantime, the edge 405 on lower side of brake block body 400 (which has slightly rotated toward left) contacts the end plane 115 of rib 113 on the inner wall in lower side of case body 100, rotates a certain angle up to the reverse position with a difference of 180° from originally pressing the drawer 20 into the case body 100, and contacts the inner edge 117 of lug 113 to be free of any limitation so that the drawer body 200 originally to be open under the elastic force of spring 30 may smoothly actuate the brake block body 400 to spring outward for the opening action along the inner edge 117 of rib 113 (as shown in FIG. 4). The drawer body 200, when fully opened, may help the two convex pillars 209 on the back side of the base plate 201 stop at the outer end of guide groove 112 on the inner wall of lower side of case body 100 to keep the opening state without being sprung out the outer side of case body 100 to come off under the elastic force of spring 30 in favor of taking, loading and using the sound/video recording tape cassette 60 or the similar article (as shown in FIGS. 3 and 4). from the drawer body 200.

In further favor of taking and loading the sound/video recording tape cassette or the similar article in the drawer body 200 of this invention, a lifting spring leaf 50 may be inserted in the present longitudinal penetrating slot 207 on the rear plate 203 of drawer body 200. When the stepped flange 205 on the inner edge on two sides of central window 204 on the base plate 201 is inserted in the two U-shaped guide grooves 110 on the case body 100, the lifting spring leaf 50 is inserted in the U-shaped guide groove 111 on two sides of arcked convex wall 109 of case body 100 to lift upward and lay horizontally along with the opening and closing actions of drawer body 200, so that when the drawer body is open, the lifting action of lifting spring leaf 50 can automatically float the article e.g. sound recording tape cassette contained in the drawer 20 (as shown in FIG. 3) in favor of taking out the said article therefrom. As shown in FIG. 1, the J-shaped lifting spring leaf 50 whereon a long window 501 is at the center, is a sheet steel or stainless steel body 500 with both width and thickness corresponding to the two opposite U-shaped guide grooves 111 of the arcked convex wall 109 on the case body 100 in favor of being inserted in the two guide grooves 111. The lifting spring leaf 50 is designed to be installed in the present longitudinal penetrating slot 207 on the rear plate 203 of drawer body 200 in the manner of optionally movable assembly and disassembly, so that installing the said lifting spring leaf 50 depends on the requirement for the article contained in the drawer body 200. It may be removed if present and may be installed if not preset since installing and removing it are very convenient.

As shown in the drawings, obviously only a brake block 40 is mounted on this invention, but two brake blocks 40 (namely, a set) may be mounted. In the latter case, it is in need of installing a rib 113 and a lug 114 on the outer sides of two convex pillars 209 on the inner wall of lower side of case body 100.

As shown in FIGS. 8 and 9, the container of this invention can be overlapped and connected to another one or more containers thereof through the the opposite dovetail ribs 102 and dovetail fillister 103 on the upper and lower surfaces of case body, and these containers can be optionally removed and repeatedly overlapped for desirable use.

Figure 10:
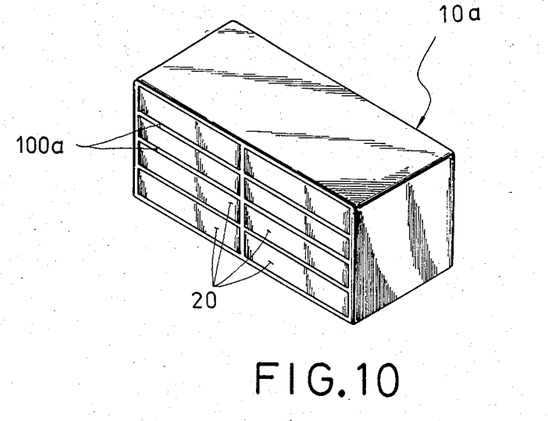
FIGS. 10 and 11 are elevation views of examples of this invention wherein several or a plurality of transversely and longitudinally arranged separate cases of drawers are contained in a large case.
Figure 11:
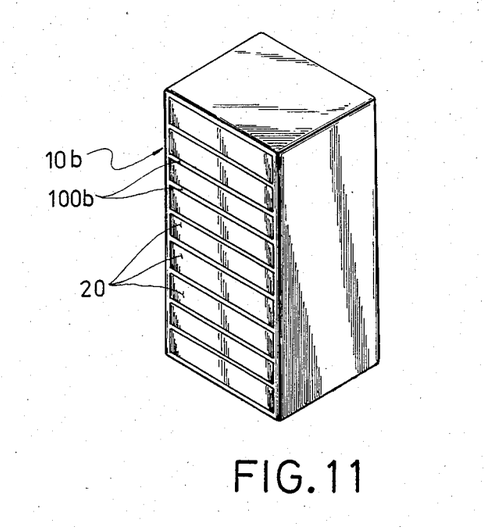

As shown in FIGS. 10 and 11, the two large uniform sound/video-recording tape storing devices 10a, 10b form an example of combining several or a plurality of transverse and longitudinal arrangements, so these two large devices 10a, 10b can contain several or a plurality of drawers 20. The combining structure of respectively containing each drawer 20 in each unitary case body 100a, 100b in the large case body is in favor of installing and removing each drawer 20, and such a design can be in the best favor of portability and placement for use of this invention.

I claim:

1. An article storing device comprising a case with an open front, a drawer received in said open front holding said article, means for connecting said drawer to the interior of said case for movement relative thereto, means for biasing said drawer for movement exteriorly of said case, means located on the bottom of said drawer and on a cooperating wall of the case and including oppositely located cam surfaces relative to a pivot point responsive to inward movement for locking said drawer in a closed position interiorly of said case, said cam surface responsive to further inward movement for unlocking said drawer.

2. A sound or video-recording tape storing device comprising: a case which is a hollow body, wherein a plane convex wall with opposite traverse U-shaped guide grooves on two sides is at the center of the inner side on the lower wall body thereof, an arcked convex wall having opposite traverse U-shaped guide grooves on two sides is at the center of said plane convex wall, two guide grooves are on the inner wall of the lower side of said case on two outer sides of said plane convex wall, a lug with an inclined plane is in a position nearby the bottom of the case body on the outer side of one traverse U-shaped guide groove on the outer side of said plane convex wall, and a rib is on the outer side of at least one guide groove;

a drawer which is a U-shaped shallow drawer body comprising a base plate with a window at the center, a front plate, and a rear plate, wherein the dimension of the front plate meets with the opening edge of the case body, the drawer body is inserted in the opposite traverse U-shaped guide grooves on two sides of the plane convex wall in the case body through two opposite stepped flanges on the inner edge on two sides of the window on the base plate in keeping with the opposite traverse U-shaped guide grooves on two sides of the plane convex wall on the inner side of the lower wall of the case body, and in the rear of the back side of the base plate, at least one stepped plane in the position corresponding to at least one guide groove on the inner wall on the lower side of the case body, and a fixed convex pillar on the lower stepped plane;

a spring which is installed in the arcked convex wall on the lower inner wall of the case body; and a brake block which is a square or rectangular block body whereon two opposite V-notches are on two sides and a hole is at the center, to be pivotally mounted on the convex pillars on the back side of the base plate of the drawer body;

when the drawer is pushed into the case body with a finger, the brake block moves inward along the rib on the inner wall on the lower side of the case body; when the arcked inclined plane of the upper V-notch on the brake block body contacts the lug on the inner wall on the lower side of the case body, the brake block moves obliquely along the inclined plane of the lug; when the finger pressure on the front plate of the drawer body is released, the drawer body may spring outward to open through the elastic force of the spring, however the arcked inclined plane of the lower V-notch on the brake block contacts the end plane of the rib on the inner wall of the lower side of the case body to catch the inner edge of the rib is a state of almost traverse placement so that the drawer body is kept in the case body to be closed and remains in a closing state; when drawer is pressed inward with a finger to let the drawer body move slightly inward toward the case body so that the brake block follows to move inward, the edge on the upper side of the brake block in a state of almost transverse placement contacts the inclined plane of the lug on the inner wall on the lower side of the case body and rotates slightly toward the left for a certain angle; when the finger pressure on the front plate of the drawer body is released, the drawer body sprung outward through the elastic force of the spring, the edge on the lower side of the brake block body has slightly rotated toward the left and contacted the end plane of the rib on the inner wall on the lower side of the case body, rotates a certain angle up to the reverse position with a difference of 180° from originally pressing the drawer into the case body which may smoothly actuate the brake block body to spring outward for the opening action along the inner edge of the two convex pillars on the back side of the base plate stop at the outer end of the guide groove on the inner wall of the lower side of the case body to keep the opening state.

3. A sound/video-recording tape storing device as claimed in claim 2 which comprises:

a longitudinally penetrating slot at the center of the rear plate of the drawer body; and a J-shaped lifting spring leaf with a long window at the center having a sheet steel body or stainless steel body to be inserted in the two guide grooves on the two sides of the arcked convex wall in the case body;

when the drawer body is inserted in the case body through inserting the lifting spring leaf in the preset longitudinally penetrating slot on the rear plate of the drawer body, the lifting spring leaf is also inserted in the traverse U-shaped guide grooves on the two sides of the arcked convex wall of the case body to lift upward and lay horizontally along with the opening and closing actions of the drawer body, so that when the drawer body is open, the lifting action of the lifting spring leaf can automatically float the article contained in the drawer in favor of taking out the article therefrom.

4. A sound/video-recording tape storing device as claimed in claim 2 which comprises a large case body to contain a plurality of uniform unitary case bodies with a plurality of transversely or longitudinally arranged drawers, wherein each unitary case body is equipped with the combining structure of respectively containing each drawer.

5. A sound/video-recording tape storing device as claimed in claim 2 wherein the case body has several conventional dovetail convex ribs on its upper surface and several conventional dovetail fillisters on its lower surface for overlapping and connecting two bodies through inserting said several dovetail convex ribs on the upper surface of one case body in said several corresponding dovetail fillisters on the lower surface of another one case body, a pair of bevel triangular projections with suitable height on the upper surface of each case nearby rear side, a pair of recesses with corresponding dimension, area and depth on the lower surface thereof in the corresponding positions, and two grooves on the rear side thereof to form a rib-shaped flange between each recess and groove so that when one case body is inserted in another one case body for overlap and connection, the two grooves can guide the two projections to cross the two rib-shaped flanges so as to catch these projections in the two recesses with a positioning sense and action.

* * * * *